Sept. 20, 1932.  A. W. REYNOLDS  1,877,777
TRACTOR CULTIVATOR
Filed Feb. 13, 1931   3 Sheets-Sheet 3
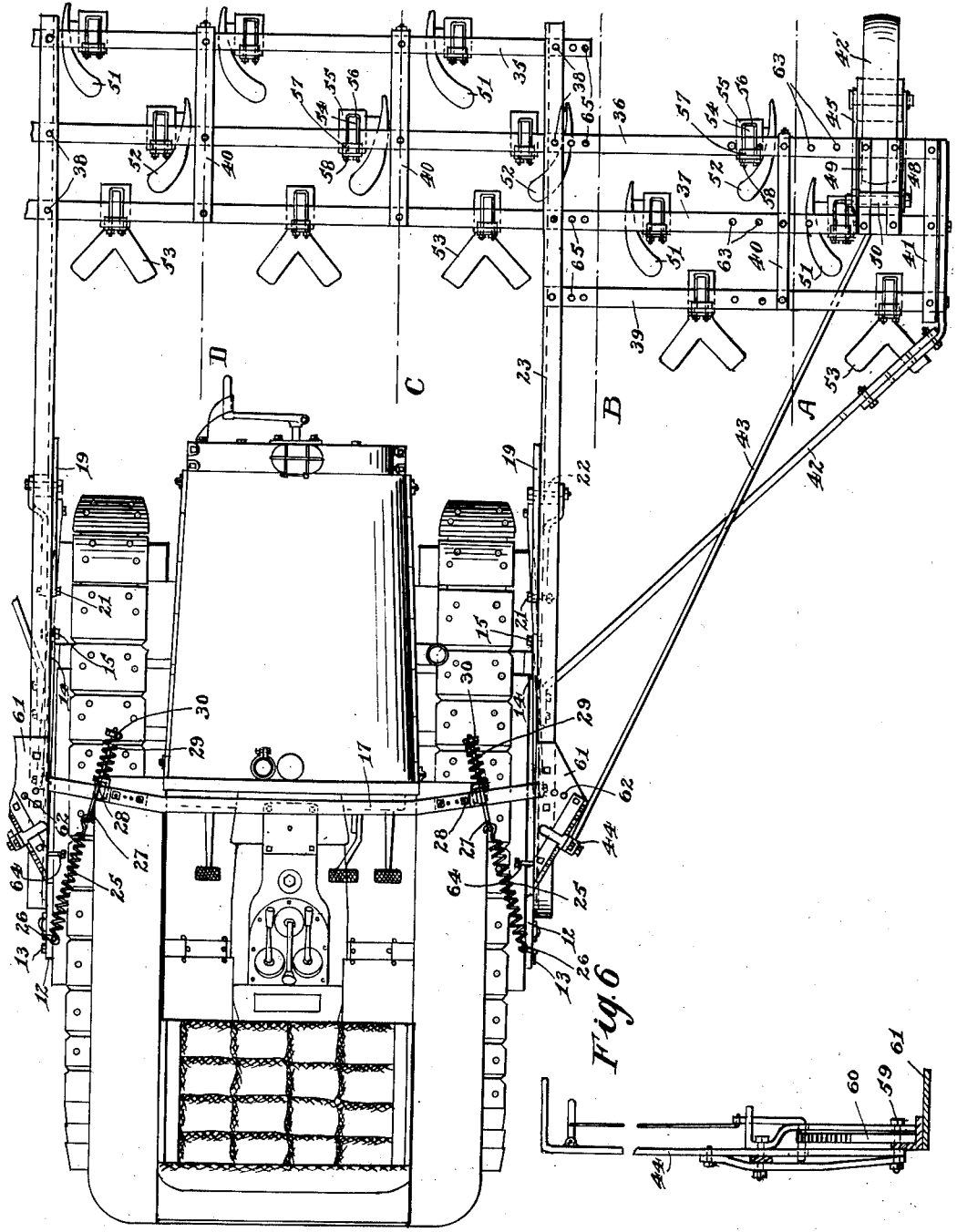
INVENTOR.
Arthur W. Reynolds
BY
Chamberlain & Newman
ATTORNEYS.

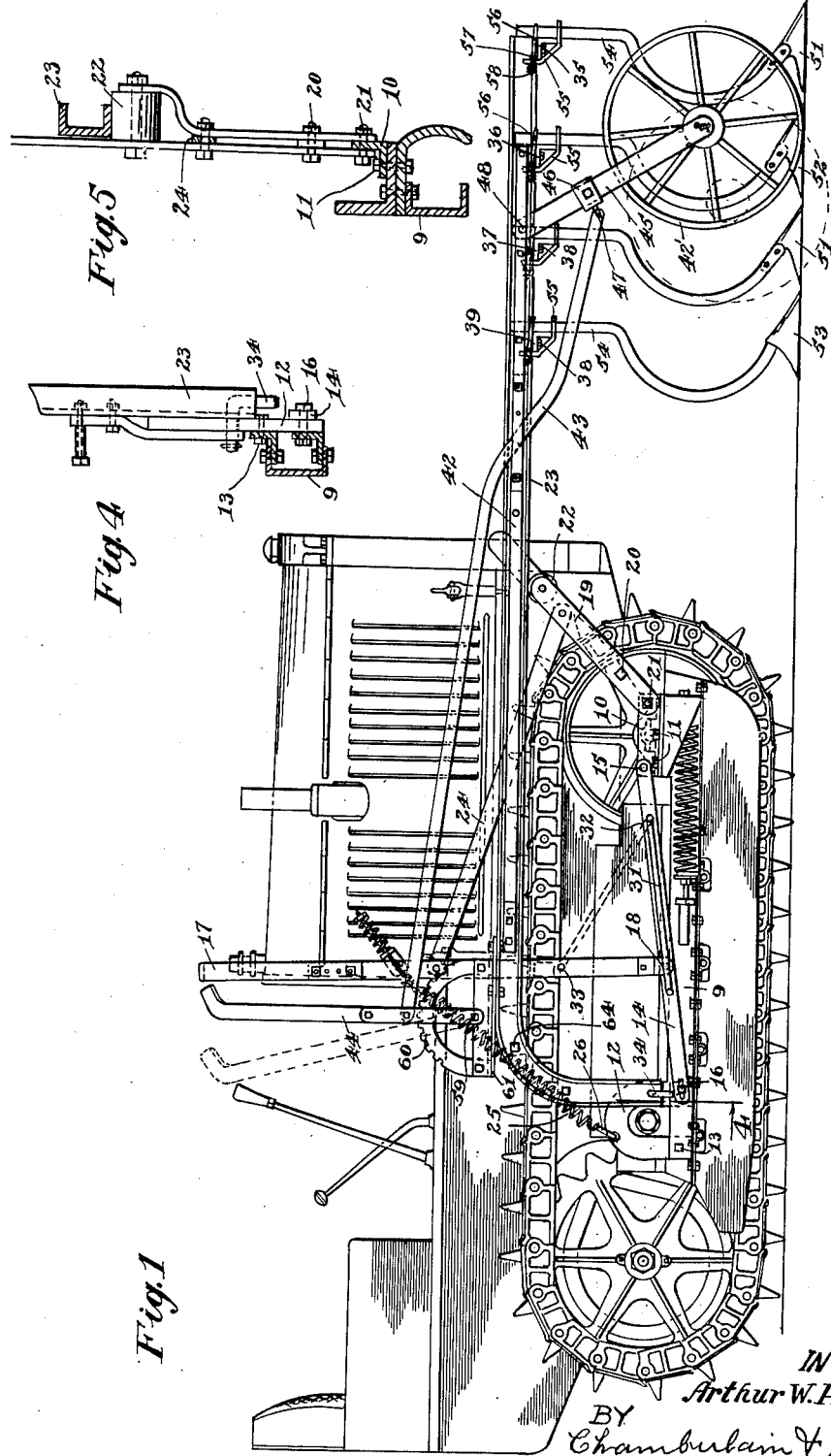

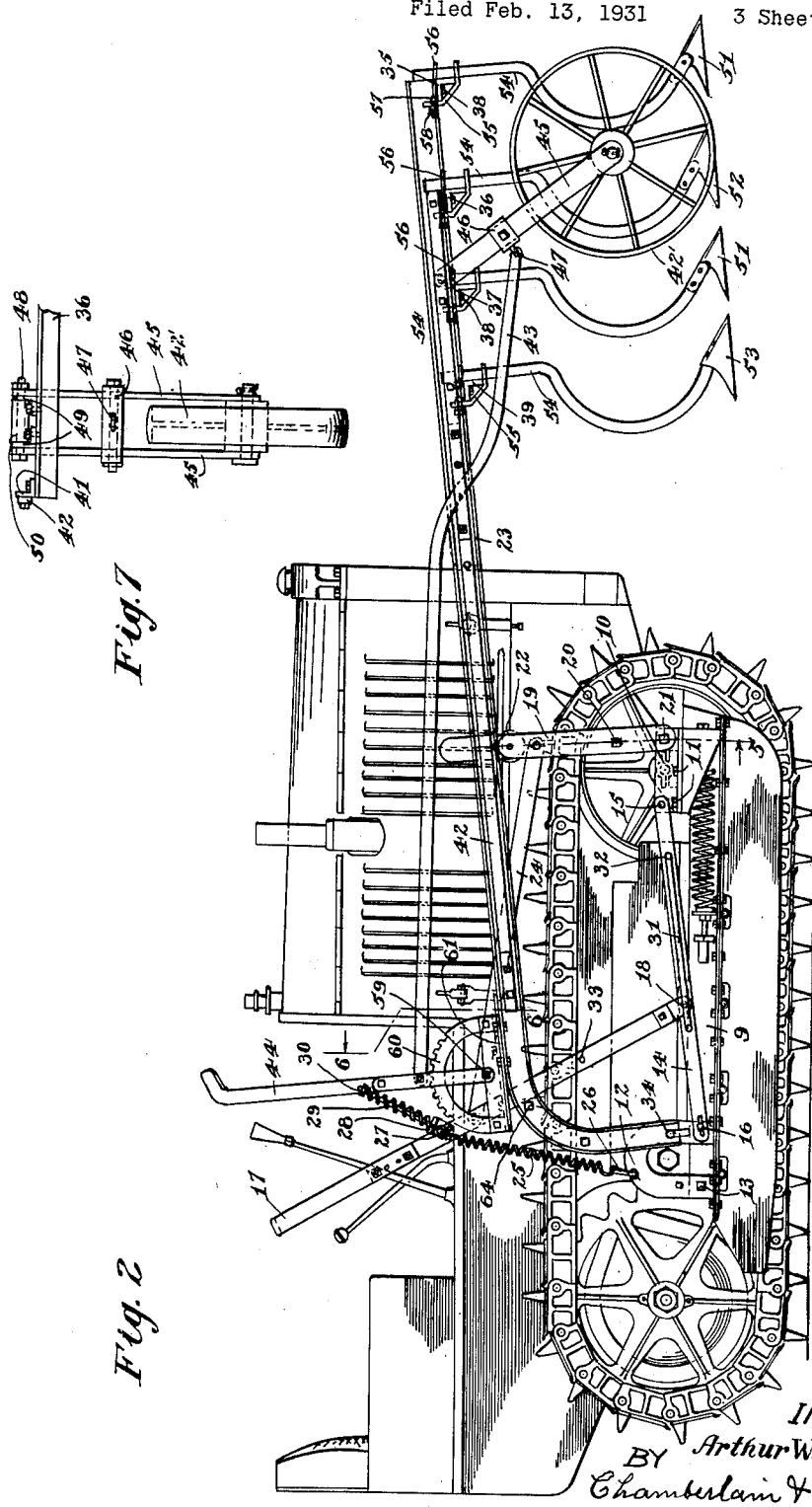

Patented Sept. 20, 1932

1,877,777

UNITED STATES PATENT OFFICE

ARTHUR W. REYNOLDS, OF LEONARDSVILLE, NEW YORK, ASSIGNOR TO THE BABCOCK MANUFACTURING CO., OF LEONARDSVILLE, NEW YORK, A CORPORATION OF NEW YORK

TRACTOR CULTIVATOR

Application filed February 13, 1931. Serial No. 515,476.

The present invention refers to tractor cultivators such as are adapted for attachment either to and forward of a tractor or to and rearward of the tractor, and in a manner to be wholly or partially supported by the tractor.

The invention further relates to that class of cultivators which, when connected to the tractor, are so closely associated and connected as to allow a single person to operate both the tractor and cultivator, when on the road and in the field.

The object of the invention is to generally improve upon this class of cultivators by providing a cultivator which is adapted for different commercial types of tractors, particularly of the caterpillar track type tractors, and to so construct the cultivator as to permit it to be quickly and conveniently connected to and disconnected from a tractor, and to provide a cultivator that is especially adapted to be positioned forward of the machine where its operation or action can best be observed by the operator, and whereby a short couple of tractor and cultivator may be obtained in a manner to permit the machine to be turned in a relatively short circle.

Another object of the invention is to provide a cultivator wherein the extended or tooth-carrying portion can be easily and conveniently lifted from the ground and the cultivator entirely supported upon the tractor better to permit the machine to be turned in short radiuses at the end of rows and for travelling over the road.

A further and important object of the invention is to provide a flexible frame structure for the cultivator and separate and independent operating means for raising and lowering the end portions of the frame with respect to the ground, better to adapt it to uneven conditions and variations of the soil.

Still another and important feature of the invention is the provision of a roller lift form of operating means whereby the ground engaging members of the cultivator may be entirely raised from the ground by a comparatively convenient and easy operation and to so construct and arrange this lift means as to have it also automatically serve to support the cultivator in its raised position, without the necessity of additional locking or holding mechanism.

A further and especially important object of the invention is to provide a cultivator that is adapted to small crops and irrigated sections of land where crops are planted in beds, that is plots of ground that are relatively narrow and long, the beds being divided by small irrigation ditches arranged at approximately three to four feet apart, and in which case the wheels of the cultivator would be positioned at corresponding distances apart, so that they will roll in the ditches better to mark the line of travel of the machine, and cover the entire area of the ground between the said ditches. In this respect I also provide a hoe to follow the before mentioned wheels, for the purpose of cleaning out the said small irrigating ditches in which the wheels travel.

With the above and other objects in view, embodiments of the invention are shown in the accompanying drawings and these embodiments will be hereinafter more fully described with reference thereto, and the invention pointed out in the appending claims.

In the drawings:

Fig. 1 shows a side elevation of my novel tractor cultivator attached to and in front of a "track" type tractor;

Fig. 2 shows a further side elevation of the tractor and cultivator, the latter being shown in a raised position, as in travelling over the road or for turning in field work;

Fig. 3 shows a top plan view of the tractor and cultivator shown in Fig. 1, one side portion of the cultivator being broken away to conserve space;

Fig. 4 shows an enlarged vertical sectional elevation taken on line 4 of Fig. 1, showing the means for fastening the supporting plate to the tractor and the means of attaching the cultivator push beams to said plate and tractor;

Fig. 5 is a similarly enlarged vertical sectional view taken on line 5—5 of Fig. 2 showing the supporting plate attached to the forward end portion of the tractor, and to which the roller lift arm is hingedly connected;

Fig. 6 shows an enlarged sectional elevation taken on line 6—6 of Fig. 2 better to illustrate the depth wheel lever operating mechanism; and Fig. 7 shows a front elevation of the depth wheel, its hanger and supporting means.

The cultivator, as shown, is designed to cover six rows of plants, such as lettuce, beans, and the like, see dotted lines A, B, C, D Fig. 3, located twenty inches apart, but can be readily adjusted to accommodate rows of greater or lesser distances apart, as may be necessary, for smaller or larger plants.

As designed, the cultivator is made up of three sections, first the forward or tooth-carrying section, which in practice is about eleven feet in width and extends crosswise in front of the tractor and is provided with a wheel under each end portion that acts as a depth gauge rather than a supporting means for the tooth-carrying frame. Means is also provided for separately adjusting these wheels and the frame so that the teeth carried by the frame may be caused to run through the ground at different depths, or whereby either end of the frame can be independently raised or lowered to run the teeth deeper or shallower on one end than the other, to better conform to the contour of the ground.

The other two sections, so-called, of the cultivator are substantially alike in construction, one being secured to each side of the tractor and serve as means to which the two supporting or push-beams of the cultivator are attached, and which are connected and disconnected by the application and removal of aligned bolts, one on each side of the machine. These two last mentioned sections include roller lift operating means which, while separately connected to the two push beams are operatively connected to be simultaneously raised and lowered by means of a single operating lever. These connected lift operating means, while detachably mounted upon the tractor can be left on it, if desired, when the cultivator is detached, and the tractor used for other purposes, or may be removed by taking out a few bolts.

These two last mentioned, so-called, side sections of the cultivator are alike in construction except that one is a right and the other a left, and are applied in like manner to corresponding parts of the opposite sides of the machine and therefore I will use but one set of reference characters to designate the corresponding parts of the two sections. What has been said of these two sections is also to some extent true of the general design of the cultivator, since its two side portions are substantially alike and in practice would probably carry the same number and style of cultivator teeth. The depth wheel and its connected parts on each end are also alike and as before stated are adapted for independent operation by the driver.

Referring now to the details of construction of the side sections of the cultivator referred to as being attached to the opposite sides of the tractor, it will be seen that as a means of attaching these sections, I have secured an angle plate 10 to the forward part of the tractor frame 9 by means of bolts 11, and a hitch plate 12 to the rear portion by means of angle plates and bolts 13, see details Figs. 4 and 5. The forward end of a supporting bar 14 is secured to the plate 10 by means of a bolt 15 and its rear end portion is likewise slidably secured to the member 12 by means of a bolt 16. A bow-shaped operating lever 17 which extends across the tractor in front of the operator's seat has its depending end portions hingedly connected as at 18 to these supporting bars, one on each side, so that the upper portion of the operating lever is free to be shoved forward and backward for the simultaneous operation of the respective roller lifts included in the two sections of the cultivator secured to the opposite sides of the tractor.

19 represents a lifting arm which is preferably formed of two pieces of metal secured together, as at 20, and having their lower ends hingedly connected to a bolt 21 supported in the plate 10. The upper end portion of the outer member of this arm is bent to receive a roller 22 to engage the under side of the push beam 23. One end of a link 24 is connected to this lifting arm and the other end to the operating lever 17 for the purpose of operating the arm by the manipulation of the lever. One end of a lift expansion spring 25 is connected at 26 to the hitch plate 12 and the other end to an eye-bolt 27 slidably mounted in an angle piece 28 secured to the lever, a compression spring 29 being mounted on the eye-bolt between the angle plate and a nut 30.

The purpose of the shorter and lighter compression spring 29 is to give sufficient tension to hold the rollers back under the push beam past a central vertical line of the arm 19 and against the lever stop 64 so the cultivator will not shake down or drop, in travelling over the road, and without stretching the longer and heavier expansion lift springs 25 too much or putting too great a tension on them, so that it might be difficult to push the lever forward when it was desired to drop the cultivator. By this means the operator gets full tension to start the lift when lever is pulled back and then just a little more tension from compression springs to roll the lever back and hold it. There are, of course, two of these spring connections for the lever, one on each side, connected as between the said lever and the attached plates 12. 31 indicates a brace rod having right angularly disposed end portions, one adapted for positioning in a hole 32 of the supporting bar 14 and the other for engagement with a like hole in the same bar, see full lines Fig. 1, as a carrying position. This rear end of the rod is also adapted to engage a hole 33 in the lever 17, see dotted lines, Fig. 1, to hold the lever 17 forward with tension on the springs and the roller arms also forward and below the push beams 23 in order that the cultivator may be more easily attached to and detached from the tractor without taking off the springs each time.

Thus far has been described the two side sections of the cultivator that are mounted upon opposite sides of the tractor, and which, as before stated, may be carried on the tractor, if desired, while it is being used for other purposes. The other or main section of the cultivator is directly connected to the hitch plates 12 of these two attached side sections, through the medium of aligned bolts 34, one on each side, whereby the bent-down end portions of the push beams are supported. The push beams 23 may be formed of channel iron, as shown and are alike and straight, except for the right angularly downwardly disposed inner end portion, and are substantially parallel to each other and in proper spaced relation one to the other to receive the forward end of the tractor therebetween and in addition to the detachable connection 34 before mentioned, may be supported on the roller 22 before referred to. These push beams 23 may be widened out and attached to the cross bars 35, 36 and 37 at holes 65, Fig. 3, to accommodate wider tractors and the brace 42 is then shortened.

The forward parallel end portions of these push beams are connected by cross bars 35, 36 and 37, which are arranged at a right angle to the push beams and secured thereto by bolts 38. The bars 36 and 37 are longer than the bar 35 and extend out beyond the sides of the tractor as does also the two bars 39, one on each side, so that three rows of cultivator teeth may be carried upon these outer sections in the same manner as are the three rows arranged across the front of the tractor, some of the latter teeth on the front portion being positioned slightly in advance of the teeth carried on the sides. In addition to the push beams for connecting the cross bars, I provide straps 40 that are bolted to the respective cross bars, and the outer end portions are further connected by angle bars 41 and the end portion of a brace 42, the other end of which, see Fig. 3, is connected to the side of the push beams in a manner to brace and stiffen the frame structure of the cultivator.

The two hangers and depth gauge wheels 42′ are alike in construction, one being carried upon each end portion of the frame in a way to hang there below and adapted to be adjusted forward and backward through the medium of a rod 43 and an operating lever 44 positioned adjacent the driver's seat. A backward pull upon this lever by the driver obviously will draw the wheel 42′ rearward as suggested by the dotted lines, Fig. 1, in a way to raise the hoes to more lightly cultivate the ground, whereas, a forward movement of the lever and depth wheel will lower the frame and hoes so as to permit the hoes to run deeper in the ground.

The hangers for these wheels comprise a pair of vertically disposed plates 45 that are secured together in spaced relation by a yoke 46, the end portions of which are bolted to the sides of the said plates and whose intermediate portion is provided with a U-bolt 47 for the connection of the before mentioned rod 43. The upper end portions of these hanger plates are hingedly carried on the end portions of a bolt 48 that is supported in the two parallel hanger pieces 49 connected to the outer end portions of the cross bars 36 and 37, and may be moved along said cross bars and attached at holes 63 as desired, to center the wheels for different widths of rows. A sleeve 50 is positioned upon the said bolt, between the said angle plates in a manner to insure the free swinging movement of the hanger plates.

Any desired number, style or shape of cultivator teeth may be employed according to the class of plants which are to be cultivated. Usually however, when used purely as a cultivator, these teeth or hoes would be of the general types shown in the drawings: namely, a right, a left and a double hoe or sweep, as for instance 51, represents a right form of hoe, 52 a left form of hoe, and 53 a double form of hoe, the three being arranged on the first, second and third cross bars respectively and so that the two first hoes will serve to cover the sections of ground adjacent to the sides of the rows of the plants, whereas the third or sweep covers the remaining portion of the ground to throw the soil from the center toward the plant rows. One of these sweeps 53 is also positioned on the rearmost bar 39, immediately back of the depth wheel, so as to follow the same, obliterate its track and clean out the furrow or irrigation ditch, through which it travels. Hoes of this type are carried on the lower end of the shanks 54 which may be either straight or curved, as preferred.

The construction of the means for attaching these cultivator teeth to the cross bars, as herein shown, forms the subject matter of a co-pending patent application, filed January 29, 1931, Ser. No. 512,049. This structure briefly includes a special form of plate 55, through an opening in one end portion of which is positioned the shank of the cultivator tooth, a U-bolt 56 that engages another portion of the shank of the tooth, a wedge 57 and nuts 58, whereby the plate and U-bolt are drawn up tightly against the shank of the tooth in a way to firmly clamp it against the front of the cross beams in a manner to prevent sidewise movement. It will also be understood that provision is made for adjusting the shanks with respect to the cross bars to accommodate rows of greater or lesser distances apart, or to work closer or further from the row.

The operating levers 44 heretofore referred to and which serve to adjust the depth wheels, may be of the usual or any preferred form of sector lever; as for instance, like that shown, see Fig. 6, the upper end forming a handle and the lower end being hingedly connected as at 59 to the base portion of the toothed sector 60. This lever is provided with a spring actuated locking pawl for engagement with the teeth of the sector, and includes a latch for disengaging the pawl from the sector teeth for the purpose of operating the lever. The bases of the sectors are secured to the plates 61 that in turn are bolted to the push beam and whereby the operating levers become fixed parts of the forward section of the cultivator and moves with it when detached from the tractor. A series of holes 62 in the plate 61 permits the forward end of the sector to be adjustably secured to the plate so as to better align with other positions of the depth wheels, should it become necessary to shift the same in, as for instance, to the holes 63 in the bars 36 and 37, to accommodate plots of ground wherein the irrigated ditches are closer together or wherein the rows of plants are different distances apart. In this connection it may also follow that the cultivator teeth would have to be repositioned on their respective cross beams which can, of course, easily be done by simply loosening the nuts.

Having thus described my invention, what I claim and desire to secure by Letters Patent is:

1. A cultivator including push beams, a tractor, and means for the detachable connection of said beams to a tractor, roller lift means mounted upon the tractor to engage said beams in a way to lift the cultivator from the ground, and means for operating said roller lift means.

2. A cultivator including a frame carrying cultivator teeth, push beams forming a part of said cultivator frame, means for the detachable connection of one end of said beams to opposite sides of a tractor, roller lift means one on each side of a tractor to engage each of said means in a way to lift the same and cultivator teeth from the ground.

3. A cultivator including beams and sections for attachment to opposite sides of a tractor each section including a hinged arm having a roller bearing for engagement with the beams of a cultivator, an operating lever connected with the arm, a tooth carrying cultivator section having push beams one hingedly connected to each of the before mentioned attachable sections and adapted to be supported upon the before mentioned rollers.

4. A tractor, a cultivator including sections for attachment to opposite sides of a tractor each section comprising plates for attachment to both the forward and rear sides of a tractor, supporting means connecting the two said plates. a lever hingedly connected to said supporting means, a lift arm hinged to the support and connected to be operated by the lever, a tooth carrying cultivator section having push beams one hingedly connected to each of a pair of the before mentioned attachable sections and adapted to be supported upon the before mentioned lift arm.

5. A tractor, a cultivator including sections for attachment to opposite sides of a tractor each section comprising plates for attachment to both the forward and the rear side portions of a tractor, supporting means connecting the two said plates, a lever hingedly connected to said supporting means, a lift arm hinged to the support and connected to be operated by the lever, spring means in each of the said attachable side sections to hold the arm in yieldable supporting engagement with the push beams, a tooth carrying cultivator section having push beams one hingedly connected to each of the before mentioned attachable sections and adapted to be supported upon the before mentioned lift arm.

6. The combination with a tractor, of a cultivator including a tooth carrying section, push beams, and sections adapted for attachment to opposite sides of the tractor, and each including a movable arm and having a roller for engagement with said push beams of the cultivator, an operating lever connected with the two said arms whereby the said beams may be raised or lowered.

7. A tractor, a cultivator lift adapted for attachment to the tractor comprising means to be bolted to the sides of the tractor and forming a support, a cultivator including beams adapted to be hingedly connected to said supporting means, an arm hingedly attached to the support and to engage the said beam, an operating lever mounted upon, the said support and connected to operate the arm to raise the beam.

8. A tractor, a cultivator lift adapted for attachment to the tractor comprising means to be bolted to the sides of the tractor and forming a support, a cultivator including beams adapted to be hingedly connected to said supporting means, an arm hingedly attached to the support and to engage the said beam, an operating lever mounted upon the said support and connected to operate the arm to raise the beam, spring means for counterbalancing the load upon the arm and to hold said arm and beam in a raised position.

9. A tractor, a cultivator lift adapted for attachment to the tractor, comprising means to be bolted to the side of the tractor and forming a support, a cultivator including beams adapted to be hingedly connected to said supporting means, an arm hingedly attached to the support and to engage the said beam, an operating lever mounted upon the said support and connected to operate the arm to raise the beam, a brace for detachably connecting said support and operating lever to hold the arm in a manner to support the beam in a raised position.

10. The combination with a tractor, of cultivator sections secured to opposite sides thereof, a cultivator including a pair of push beams for positioning on opposite sides of the tractor and adapted for detachable hinged engagement with said cultivator sections, said cultivator sections including movable lift arms, the end portions of which are in operative engagement with said push beams, a single lever hingedly connected to said sections and having connections for operating the two said arms.

11. The combination with a tractor, of cultivator sections secured to opposite sides thereof, a cultivator including a pair of push beams for attachment to opposite sides of the tractor and adapted for detachable hinged engagement with said cultivator sections, said sections including hinged arms to engage said push beams, a common means comprising in part a single lever for operating the two said arms to raise and lower the cultivator beams upon its hinged connection with said side sections.

12. A tractor cultivator comprising a tractor, a tooth-carrying section including a pair of push beams, two sections adapted for attachment to opposite sides of a tractor for the support of the push beams, each section including an attachable support, a movable arm hinged to the support and having a roller for engagement with a push beam, a lever hinged to the two said supports and connected with the two said arms whereby they may be operated and the said beams raised and lowered.

13. A tractor cultivator including a tractor, sections adapted for attachment to opposite sides of a tractor, and a tooth carrying frame including push beams hingedly connected to said sections, said sections each including a hinged arm having a roller for engagement with one of said push beams, a lever and connections with the said arm whereby the beam may be raised or lowered, and spring means to normally hold the beam and cultivator in a balanced position.

14. A tractor, including a driver's seat, a cultivator hingedly connected to opposite sides of the tractor, means to wholly support the cultivator on the tractor so that the cultivator teeth will floatingly travel through the top surface of the ground, a depth wheel on opposite end portions of the frame, and independent operating levers adjacent to said driver's seat whereby either wheel may be adjusted independently of the other or whereby both wheels may be adjusted simultaneously, to raise and lower either or both ends of the cultivator and teeth to ride heavier or lighter over uneven portions of the ground.

15. A cultivator including two spaced-apart longitudinal beams, cross bars and cultivator teeth supported thereby, a tractor positioned between and to the rear of the cultivator, a brace member secured to each of the beams and extended forward and outward and having their other end portions secured to the end of the cross bars, depth wheels hingedly supported upon opposite end portions of the frame, an operating lever mounted upon each of the horizontal beams and having operative connections with the hangers for the depth wheels whereby the latter may be positioned forward or rearward beneath the frame to regulate the height of the latter above the ground.

16. A cultivator including two horizontal beams, cross bars and cultivator teeth supported thereby, a hanger bolt on each end portion of the cross bars, a hanger hingedly supported on said bolt and including spaced-apart depending plates, a spacer yoke connecting said plates intermediate their ends, an operating lever mounted on each beam and having operating connections with the yoke on the hangers whereby the wheels may be independently positioned forward or rearward beneath the frame to regulate the height of the latter above the ground.

Signed at Leonardsville in the county of Madison and State of New York this 9th day of February, A. D. 1931.

ARTHUR W. REYNOLDS.